United States Patent [19]

Mark et al.

[11] Patent Number: 4,708,760
[45] Date of Patent: Nov. 24, 1987

[54] CUTTING AND HEAT SEALING APPARATUS FOR VEHICLE SEAT INSERTS

[75] Inventors: Alfred J. Mark, Newtonville; Joseph H. P. Debettin, Whitby, both of Canada

[73] Assignee: Chrysler Motors Corporation, Highland Park, Mich.

[21] Appl. No.: 795,004

[22] Filed: Nov. 4, 1985

[51] Int. Cl.⁴ .................. B32B 31/10; B32B 31/12; B32B 31/20

[52] U.S. Cl. ................................ 156/362; 156/93; 156/251; 156/363; 156/515; 156/522; 156/552; 156/556; 156/583.1

[58] Field of Search .................. 156/583.1, 552, 556, 156/522, 251, 515, 362, 363, 364; 83/367; 100/46, 295, 93 R; 53/51; 226/43

[56] References Cited

U.S. PATENT DOCUMENTS

| | | | |
|---|---|---|---|
| 2,140,711 | 12/1938 | Mitchell | 156/552 X |
| 3,520,755 | 7/1970 | Scholl et al. | 156/380.7 |
| 3,936,041 | 2/1976 | Shiina et al. | 271/265 X |
| 4,610,533 | 9/1986 | Takahata | 271/265 X |

Primary Examiner—Donald E. Czaja
Assistant Examiner—Jeff H. Aftergut
Attorney, Agent, or Firm—Edward P. Barthel

[57] ABSTRACT

An improved apparatus for producing laminated articles such as vehicle seat inserts. A continuous web of foam riser material is intermittently advanced along the apparatus by chain drag conveyor means. Fabric cover panels are longitudinally spaced on the upper surface of the web and sewn thereto at an upstream sewing machine station. The conveyor means advances the web together with the panels to a platen press station wherein a press plate moves to insert cutting and heat sealing dies into engagement with the laminated material. A laminated insert pattern is cut from both the web and overlying cover and thereafter heat sealed around its outer perimeter by bonding means sandwiched between the panel and web. A photocell sensing arrangement is adapted to normally see-through the web such that it senses the trailing edge of each advancing panel. A control circuit, on receiving a signal from the photocell, triggers counter means thereby advancing the conveyor means one panel length such that each succeeding panel has its trailing edge aligned with the die upstream border. By virtue of sensing each panel's trailing edge, the panels may be positioned on the web with variable width longitudinal spaces therebetween. It is a requirement that the spaces have a minimum dimension enabling the photocell to reset the counter means prior to the arrival of the next panel.

2 Claims, 14 Drawing Figures

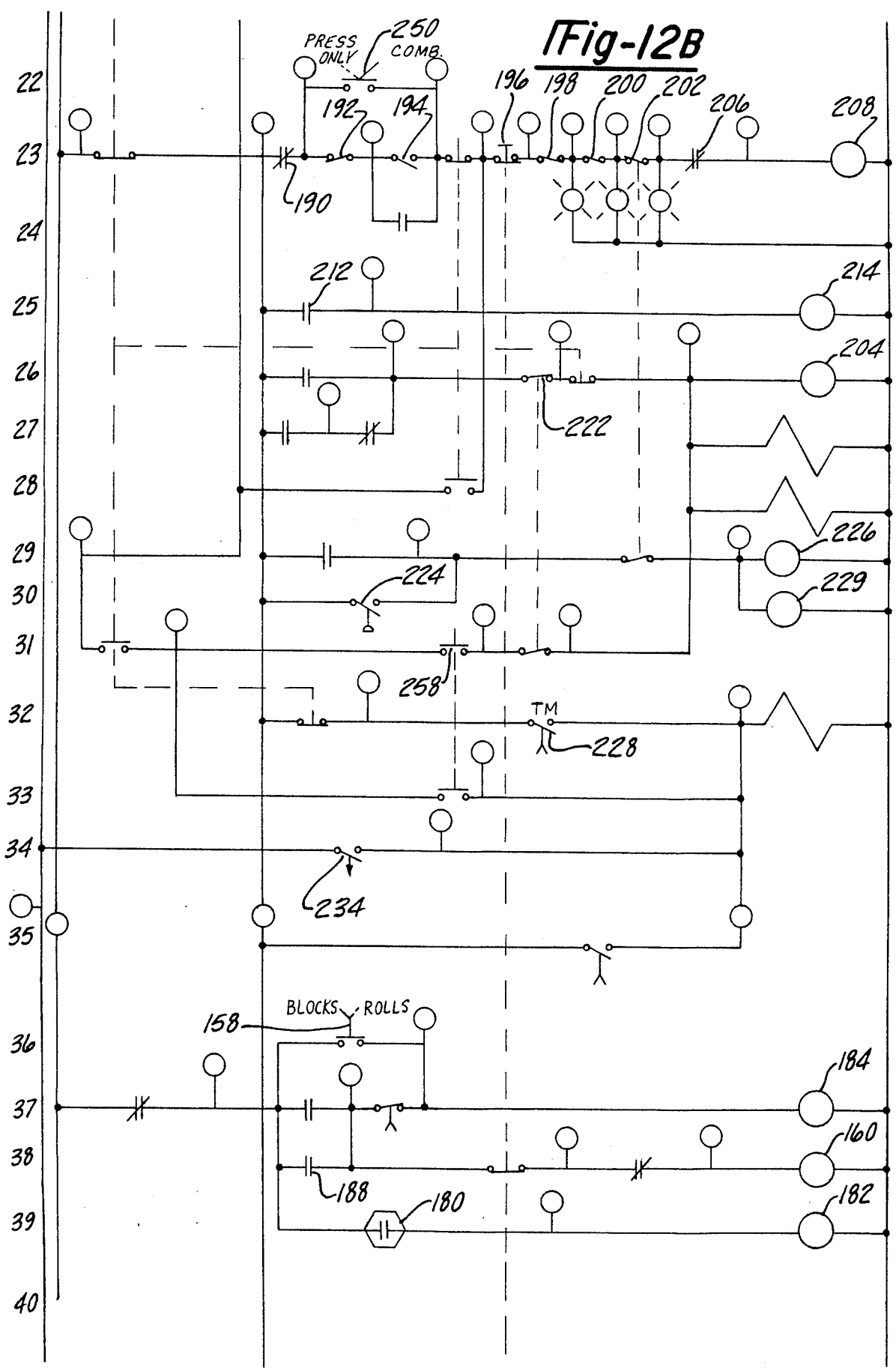

CUTTING AND HEAT SEALING APPARATUS FOR VEHICLE SEAT INSERTS

BACKGROUND OF THE INVENTION

This invention relates generally to automobile upholstery, trim panels and the like. More specifically, it relates to an improved apparatus for manufacturing upholstery plain and sewn seat inserts, trim panels, etc. for vehicles.

The U.S. Pat. No. 3,675,289 issued July 1, 1972 to Mark and assigned to the same assignee as the present application, discloses a method and apparatus for manufacturing piped covering materials for upholstery and the like. The Mark patent concerns the formation of substantially parallel slits in riser material, the pleating or pressing of the fabric into slits to form pipes and the sewing of the fabric to the riser on the backing at the bottom of each of the slits. The U.S. Pat. No. 3,520,755 issued July 14, 1970 and U.S. Pat. No. 3,701,707 issued Oct. 31, 1972 disclose apparatus for making heat-sealed articles with heat and tear seal seams. The present invention concerns an improved sewing, cutting and heat sealing in-line apparatus for producing vehicle upholstery inserts and the like which incorporates novel control features including a photoelectric sensing arrangement for a platen press operated cutting and heat sealing die.

A definition of some of the terms which will be referred to herein are defined below.

The term "insert" is meant to specify a cut and heat sealed multi-layer laminate seat cushion member such as a decorative surface material, a layer of foam material and a reinforcing layer of fabric material. The term also includes a single layer seat cushion member cut from a panel.

The term "riser" is meant in general to specify rubber or non-rubber materials fabricated in such a way as to have interstitial voids providing a certain amount of resilience to the touch and capable of recovering is shape when temporary deforming pressures are removed.

· The term "fabric" is meant any cover or surface material including leather, plastic material, i.e., vinyl chloride, vinylidene chloride and other similar synthetics formed into flexible sheets with finishes simulating leather, woven fabrics, etc., and body cloth material such as those formed of woven fabrics of the naturally, synthetic and glass type.

The term "bonding material" between the fabric and the riser is meant to include a heat reactivating adhesive film or spray coating pre-applied to the riser pad, heat reactivating glue, hot melt powder, hot melt sheeting or netting, thermo setting glue sheeting, etc. The bonding material may be loose or preapplied to the riser pad or body cloth.

The term "cut and seal process" is a process used to bond body cloth to a riser only on the perimeter by a heat sealed strip of predetermined width while during the same operation cutting the perimeter of an insert outside of the sealed strip. The cut and seal process replaces sewing or tacking and subsequent cutting while producing a dimensionally correct seat insert.

The term "panel" is meant to include a discreet rectangular shaped fabric article that is conveyed in an intermittent manner to the cut and heat sealing platen press.

SUMMARY OF THE INVENTION

The present invention involves an apparatus for producing laminated vehicle seat inserts combining a known multi-needle sewing machine station with a platen press station into a single in-line apparatus incorporating a novel electrical control system. A continuous web of foam riser material is intermittently advanced along the apparatus. Fabric cover panels are longitudinally spaced on the upper surface of the web and sewn thereto at an upstream sewing machine station. The web advances the panels to a platen press station whereon a press plate moves a combined insert cutting and heat sealing die into engagement with the laminated material. A laminated insert platen is simultaneously cut from both the web and overlying cover panel while being heat sealed around its perimeter by suitable heat activated bonding means sandwiched between the panel and web.

A photocell sensing arrangement is supported on a hinged material plate having its upstream end pivoted about a transverse axis and its downstream free end supported for travel on the press movable platen. The photocell source projector and detector are positioned on either side of a web supporting plate. The projector light source is normally blocked by being unable to penetrate both the foam material of the web and the overlying cover panel. Thus, the light is unable to pass through an aperture in the web plate for reception by the photocell detector.

Upon the web being intermittently advanced the photocell arrangement senses the passage of the cover panel trailing edge by virtue of the light source penetrating the exposed web portion intermediate the panels for reception by the photocell detector. The resultant change of state by the sensor energizes an electronic counter driven by a train of pulses emitted from a web travel sensing encoder which reads the revolutions of a web chain drive sprocket. The counter is emperically preset such that after receiving a predetermined number of pulses from the encoder it will cause the counter to stop the web chain advancement thereby positioning the sensed panels' trailing edge coincident with the cutting die upstream border. It is a feature of the invention that because the sensor senses each panel's trailing edge the panels may be manually positioned on the web with unequal longitudinal spacing between the panels. The placement of the panels sole requirement is that a predetermined minimum distance be provided between the panels so as to allow the photocell sensing means sufficient time to reset the counter prior to the arrival of the next panel.

BRIEF DESCRIPTION OF THE DRAWINGS

These and other features and advantages of the invention will appear from the following written description and accompanying drawings in which:

FIGS. 12A, 12B and 12C are the three portions of the electrical control system schematic according to the present invention.

DESCRIPTION OF THE PREFERRED EMBODIMENT

Figure 1:
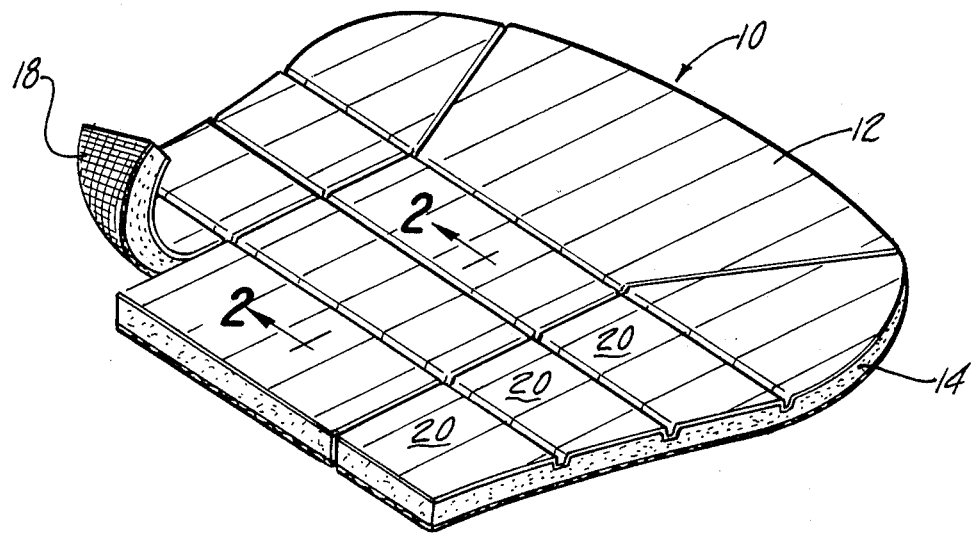
FIG. 1 shows a perspective view of automobile upholstery seat insert prepared according to this invention.
Figure 2:
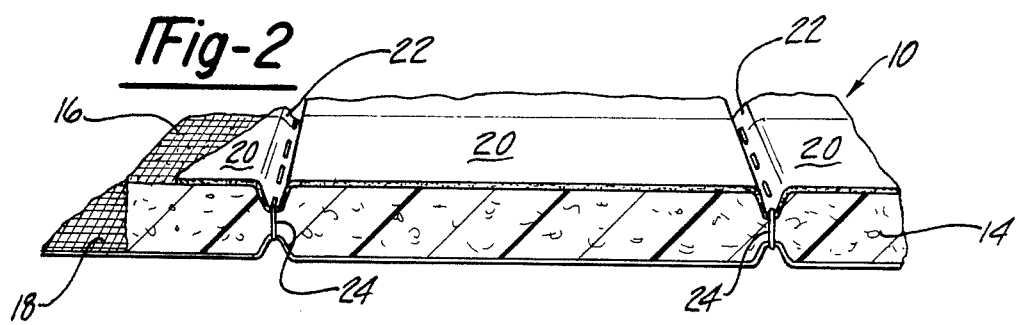
FIG. 2 is a fragmentary cross-sectional view of a portion of the seat insert of FIG. 1.

Referring to the drawings, FIGS. 1 and 2 are illustrative of the type of vehicle laminated seat insert 10 contemplated by this invention. The insert 10 includes a cover material or fabric 12 heat sealed along its perimeter to a urethane foam riser 14. It is understood that the fabric could also be vinyl or other types of material without departing from the invention. A suitable bonding material is provided between the fabric 12 and the riser 14. In the preferred form a hot melt sheeting or netting 16 is suitably applied to the upper surface of the foam riser 14 prior to its use in the instant apparatus. The bonding material could be in various other forms such as, for example, prepared foam, heat reactivating glue, hot melt powder, heat reactivating film etc. without departing from the scope of the present invention. The riser 14 is bonded to a suitable underlying fabric backing 18 for strength.

Islands or pipes indicated at 20, may be formed in the cover material 12 by pressing the fabric 12 down into a plurality of longitudinally extending grooved slits 22 in the riser 14 and sewing individual fabric panels to both the riser 14 and backing 18 at the bottom of each of the slits as indicated by stitching 24 in FIG. 2. Reference may be had to the mentioned U.S. Pat. No. 3,675,289 for a detailed description of the stitching operation the disclosure of which is incorporated by reference herein.

Figure 3:
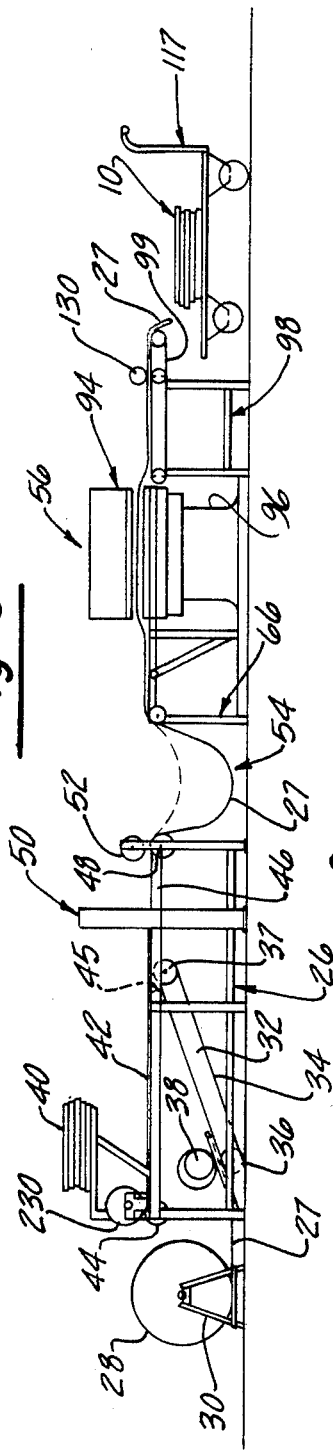
FIG. 3 is a side elevation schematic view of the apparatus according to this invention.
Figure 4:
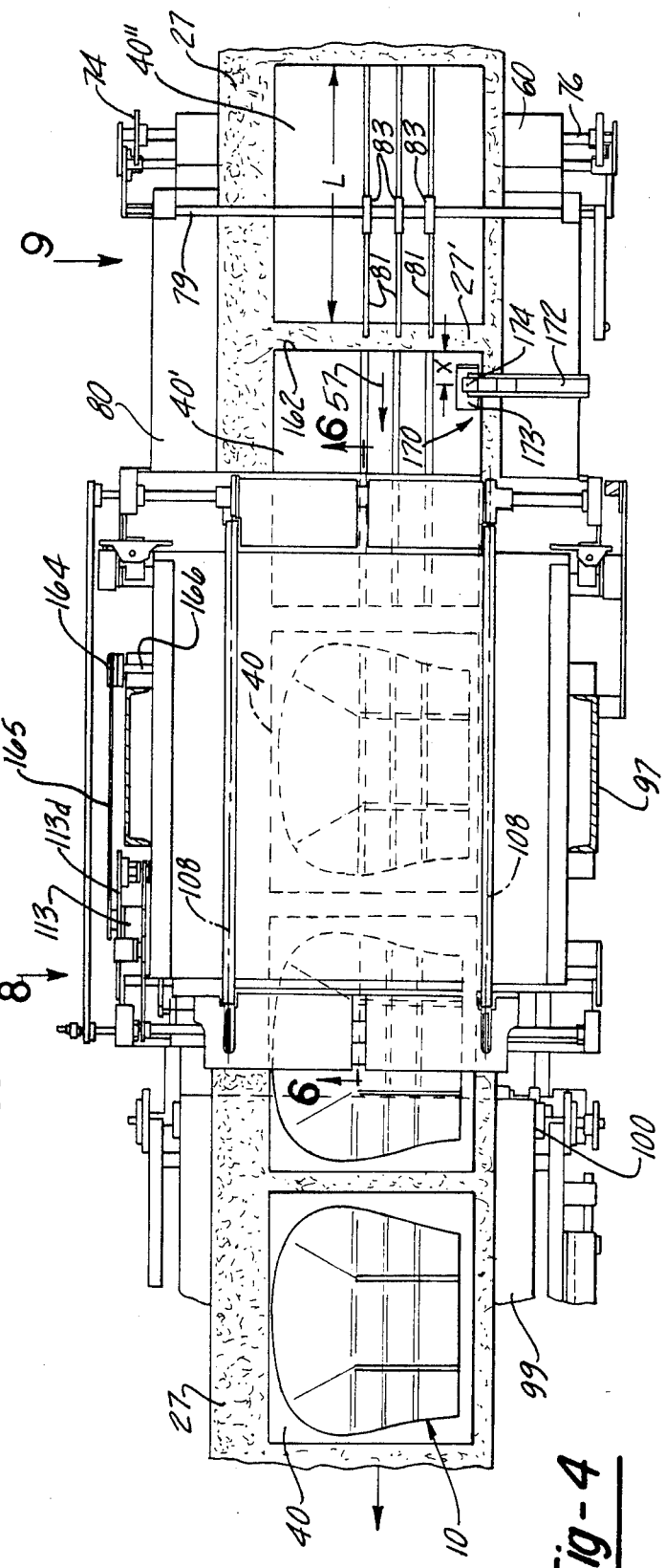
FIG. 4 is an enlarged fragmentary top elevational view of the cut and seal platen press station of the apparatus of FIG. 3.

Referring now to FIGS. 3 and 4 the preferred method of preparing the insert 10, shown in FIGS. 1 and 2 will be described in conjunction with the description of a improved in-line sewing, cutting and heat sealing apparatus, together with an electrical control system embodying portions of the present invention.

As shown in FIG. 3 the apparatus includes a substantially flat elongated first working surface support or working table 26 onto which a continuous web 27 of foam riser material 14 may be drawn. As seen in FIG. 3 the web 27 is unwound from a supply roll 28 supported on a delivery roller arrangement 30. The free end of the web 27 is moved over a lower inclined working surface 32 by conveyor means such as a first needle chain drag 34. The chain drag 34 consists of a pair of endless loops of needle chain links engaged by a pair of gear drive assemblies, generally indicated at 36 and 37, supported at the upstream and downstream ends of the surface 32, respectively. Details of a typical needle chain drag are shown in the above mentioned U.S. Pat. No. 3,675,289.

The web 27 is passed beneath rotating cutter or router means such as the conventional cutting blade assembly generally indicated at 38, carried above the inclined working surface 32, near one end thereof. The cutting blade assembly forms a plurality of transversely spaced, substantially parallel slits 22 in the web 27 as discussed in the U.S. Pat. No. 3,675,289.

At the same time rectangular fabric cover panels 40, shown stacked above the surface of working table 26, are manually removed from the stack and individually placed on horizontally disposed conveyor means 42. The conveyor means 42, preferably in the form of a plurality of transversely spaced flexible belts, is driven by a pair of gear assemblies generally indicated at 44 and 45. The gear assembly 44 is shown supported at the front end of the working table 26 while the gear assembly 45 is shown supported upstream of the gear drive assembly 37.

As the individual panels 40 arrive at the downstream end of conveyor means 42 the web 27 receives the spaced panels 40 as they are discharged from the conveyor means 42. A second horizontally disposed needle chain drag 46 is driven by a pair of gear assemblies, only the downstream one being shown at 48. The second chain drag advances the web 27, with its superimposed panels 40 thereon, through a multi-needle sewing machine apparatus generally indicated at station 50. The multi-needle sewing machine station 50 may be of conventional design such as shown and described in the U.S. Pat. No. 3,667,289 one type of which may be purchased under the trade name FALES.

The continuous web 27, with the panels 40 sewn thereon in a longitudinally spaced random manner, is fed beneath an upper guide roll 52. The web 27 is advanced by a downstream chain drag, to be described, through a depending controlled reserve loop 54. The loop 54 compensates for the intermittent advancement of the web 27 to a cut and seal hydraulically operated platen press station, generally indicated at 56 in FIG. 3.

Figure 5:
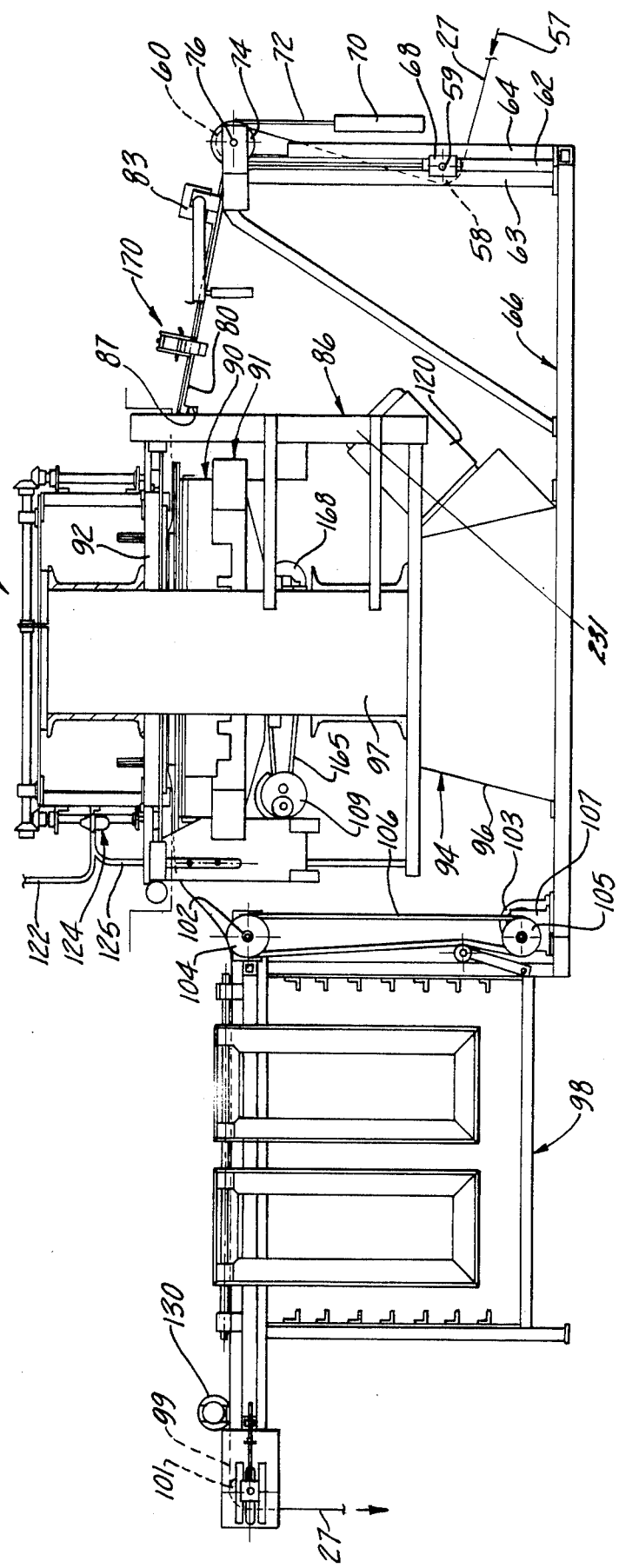
FIG. 5 is a side elevational view of the platen press station and roller table of FIG. 4.

As best seen in FIGS. 4 and 5, wherein the web 27 is intermittently advanced downstream from right to left as shown by arrow 57, the loop 54 is fed under a vertically movable lower "dancer" roll 58 and then over an upper guide roll 60. FIG. 5 shows the dancer roll 58 supported on shift 59 for reciprocal up and down movement in a vertical slot 62 defined between support track members 63 and 64 located at the front end of a in-line working support frame generally indicated at 66. The dancer roll 58 is rotatably journaled on its cross shaft 59 which shaft mounts track guide plates 68 at each end. The dancer roll 58 is biased in its uppermost position by pair of counterbalance weights 70. Each weight 70 is suspended by a flexible line 72 after the line is passed over an associated pulley 74 supported adjacent the end of upper guide roll shaft 76. A limit switch 78 controls the dancer roll 58 in conjunction with the sewing machine station 50 by means of an electrical control circuit to be explained.

Figure 11:
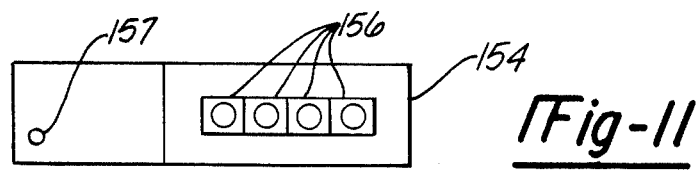
FIG. 11 is a schematic view of the counter face plate.

FIG. 4 shows the variably spaced cover panels 40, sewn to the web 27, being intermittently indexed toward the platen press station 56. A cross bar 79, supported in a spaced manner above hinged material plate 80, pivotally mounts a plurality of guide fingers 81 thereon each formed with an upwardly curved downstream end 82 (FIG. 11). The guide fingers 81 each extend from a support block 83 pivotally mounted on cross bar 79. The blocks 83 are laterally adjustable on the cross bar 79 allowing the guide fingers 82 to be variably spaced for riding in the corresponding panel grooves or slits 22 and thus assist in maintaining longitudinal alignment of the panels and the web.

Figure 9:
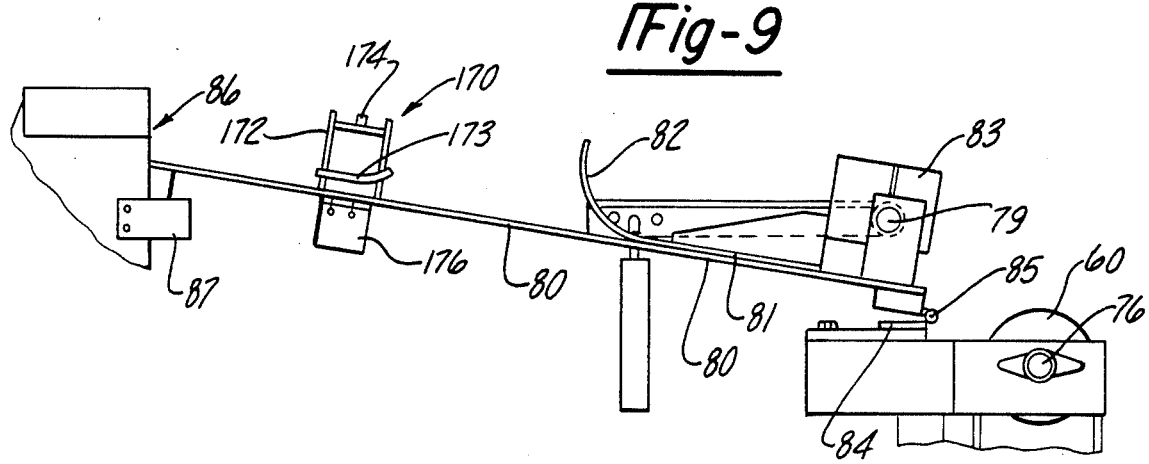
FIG. 9 is an enlarged fragmentary side elevation view of the guide plate assembly viewed in the direction of arrow 9 of FIG. 4.

In FIG. 9 it is seen that the hinged plate 80 has its upstream end pivoted on hinges 84 for swinging movement about transverse pivot axis defined by hinge pins 85. The downstream end is supported on press carriage assembly 86 by supports 87 for vertical travel therewith in a manner to be explained. It will be understood that two or more panels disposed in side-by-side transverse alignment may be sewn on the web 27 for simultaneous cutting and heat sealing by the platen press die to be described. In the case of multiple side-by-side panels additional intermediate needle chain drag conveyors may be provided, as required.

As seen in FIGS. 4, 5, 6 and 10, the web 27 and spaced panels 40 pass through the press station 56 above a lower cutting and sealing die 90 supported on a subjacent heater block assembly 91 and press bed 92. The vertically movable carriage assembly 86 of a platen press 94 vertically reciprocates the die 90, heater block assembly 91 and press bed 92 toward and away from a press top plate 95. FIG. 5 shows the platen press 94 supported on base 96 by columns 97. The platen press, which is shown in FIG. 5 in its upper closed position, will be further described later in the specification.

The web 27 exits the forward end of the press station 56 and travels to a working surface support or roller table 98. The table 98 includes run-out conveyor means such as a conveyor belt 99. The conveyor belt 99 forms an endless loop around a drive roll 100, shown in FIG. 4, and an idler roll 101 shown in FIG. 5. The drive roll 100 is mounted on shaft 102 driven by a constantly running electric motor 103. The motor 103 is drivingly connected to conveyor drive shaft driven pulley 104 by means of a drive pulley 105 and a drive belt 106 through a reducing gear box 107. The motor 103 includes clutch and brake means which are individually energized and de-energized to precisely start and stop the conveyor by means of the electrical control system to be described.

Figure 6:
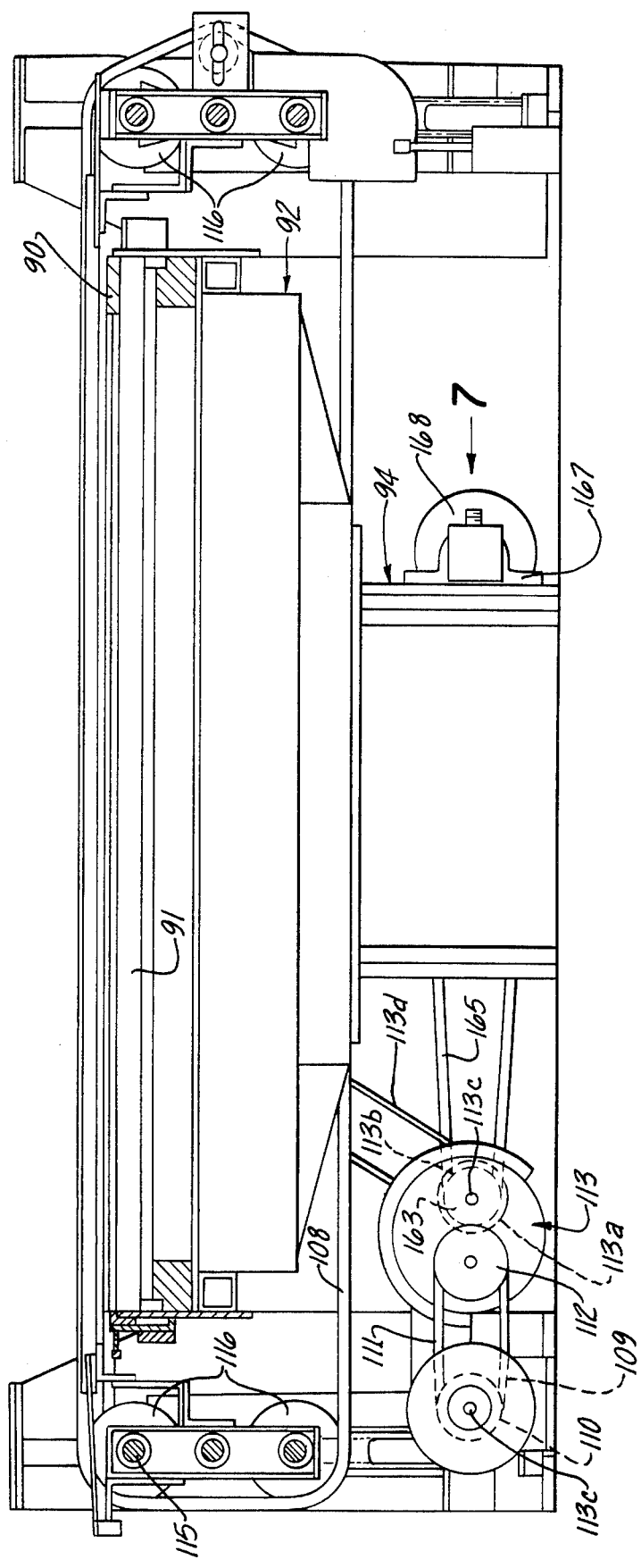
FIG. 6 is an enlarged fragmentary cross-sectional view of the block-carriage press assembly taken substantially on line 6—6 of FIG. 4.

Conveyor means, such as a needle chain drag conveyor, consisting of a pair of endless loops of toothed chain links 108 shown in FIGS. 4 and 6, advance the web 27 through the platen press station 56. A drive motor for the chain links 108 is shown at 109 having a drive pulley 110 with a drive belt 111 connected to driven pulley 112 of a gear reduction unit 113. The gear reduction unit 113 has a first drive pulley 113a an a second drive pulley 113b mounted on output shaft 113c of the unit 113. the drive pulley 113a is connected by belt 113d to drive pulley 113c which in turn is connected by bolt 113f to a driven pulley 114 and drive shaft 115. As seen in FIG. 6 the shaft 115 drives sprockets 116 of the drag chain links 108.

The drive motor 109 is designed to run at a predetermined speed slightly less than the motor 104 driving the run-out conveyor 99. This insures that a tension force is always maintained on the web 27 as it is conveyed to the roller table 98. The cut and sealed seat inserts 40 are manually removed for collection an transport by suitable means, such as by a wheeled cart shown at 117 in FIG. 3.

Figure 10:
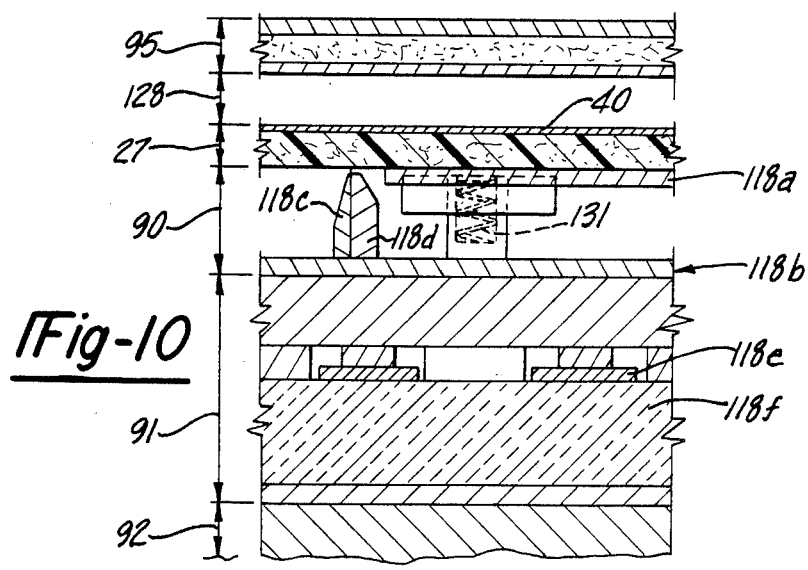
FIG. 10 is an enlarged partially schematic fragmentary cross section through the press bed, heater block, cutting and sealing die, product, and the top press plate.

FIG. 10 shows the web 27 positioned on spring loaded filler or stripper plate 118a of the cutting and sealing die 90 as the web is conveyed through the press station 56. The cutting and sealing die plate 118b is supported on the heater block 91 and includes a cutting rule 118c on its upper surface having a blade pattern which provides the desired border outline and pattern of slits for producing the finished seat inserts 10. As seen in FIG. 10 the cutting rule 118c has a coextensive heat sealing bar 118d supported flush against its inner vertical surface. Heating plates 118e, supported on insulation 118f are provided to supply heat by conduction to the seal bar 118d.

In the present embodiment a plurality of electric resistance heating elements (not shown), such as heaters sold under the trade name CHROMALOX, are used to heat the plurality of adjacent heater bars 118e. The electric heaters are protected against overheating by a thermocouple over temperature control switch shown at 119 in FIG. 12C. The sealing bar 118d conforms to the outline of the cutting rule 118c achieving a predetermined insert perimeter heat seal co-extensive with the die cut edge defining the marginal seal outline of vehicle seat insert 10.

In the disclosed embodiment wherein the thermoset type adhesive layer 16 is used (FIG. 2), the seal bar 118d is heated to a temperature of about 300° F. for a time interval of about two to four seconds and then allowed to air dry. However, a heat reactive type of adhesive material may be substituted for layer 16. In this case the seal bar 118d is raised to a temperature of about 200° F. for a predetermined heating cycle, which could be in the order of two to four seconds, to achieve a tacky or liquid state. Thereafter, the sealing bar 118d is heated to a temperatures of about 280° F. for about 10 seconds to return the heat reactive adhesive to a solid state.

The press station 56 includes the platen press 94, shown in FIG. 5, operated in a conventional manner by a hydraulic motor 121 which in turn drives a pump (not shown) so as to move the platen carriage assembly 86 toward and away from the press bed. Reference may be had to U.S. Pat. No. 2,868,942 issued Jan. 13, 1959 to F. Lyijynen, assigned to the assignee of the present application, for details of a hydraulically operated press. The disclosure of the Lyijynen patent is incorporated by reference herein.

A pneumatic system receives plant air by means of a pressure inlet line 122, at 90-100 psi, and is connected to an air filter, oil lubricator and pressure regulator generally indicated at 124. Flexible air line 125 provides a connection from the air filter to conventional air cylinders and pistons (not shown). The pneumatic system operates to raise and lower the cutting and sealing die 90 so that it may be readily replaced or exchanged with a minimum of time and labor.

The hydraulic flow of the platen press pump 121 is actuated by an electric solenoid shown at 126 in FIG. 12B which when closed lifts the movable platen press carriage assembly 86 and press bed 92 vertically. The vertical travel of the press carriage assembly 86 causes the hinged plate 80 to be pivoted upwardly about the pivot axis of hinge pins 85 from a lowered reduced angle press open position to its raised press cycled close position shown in FIG. 6.

As viewed in FIG. 5 upward movement of the press carriage causes the web 27 and an overlying attached cover panel 40 to be raised against top plate 95 of the platen press. The rule 118c has an upwardly extending knife edge which cuts the insert fabric 12, adhesive layer netting 16, riser 14 and backing 18 in the pattern of insert 10 upon the upward movement of the web 27 and panel 40 through the press travel dimension indicated at 128 in FIG. 9. At the same time that the insert 10 is cut by the rule 118c the heat sealing bar 118d seals the perimeter of the insert cover material 12 to the foam riser 14. This occurs by heating the bonding material in the form of thermoset sheet netting 16 positioned between the fabric and the riser. It will be noted that upon the cutting and heat sealing die 92 being lowered to its FIG. 10 position, the stripper plate 118a is returned to its upwardly biased position by coil springs 131.

The cut and heat sealed inserts 10, which remain tacked to the web 27, are thereafter automatically advanced by conveyor 99 and roll-out roll 130 downstream to the roller table 98 in an intermittent manner. An operator manually removes the inserts 10 from the web 27, which is supported on the roller table 98, and suitably stacks them such as, for example, on the cart 117. The waste web material may be automatically removed by suitable equipment (not shown).

Figure 12A:
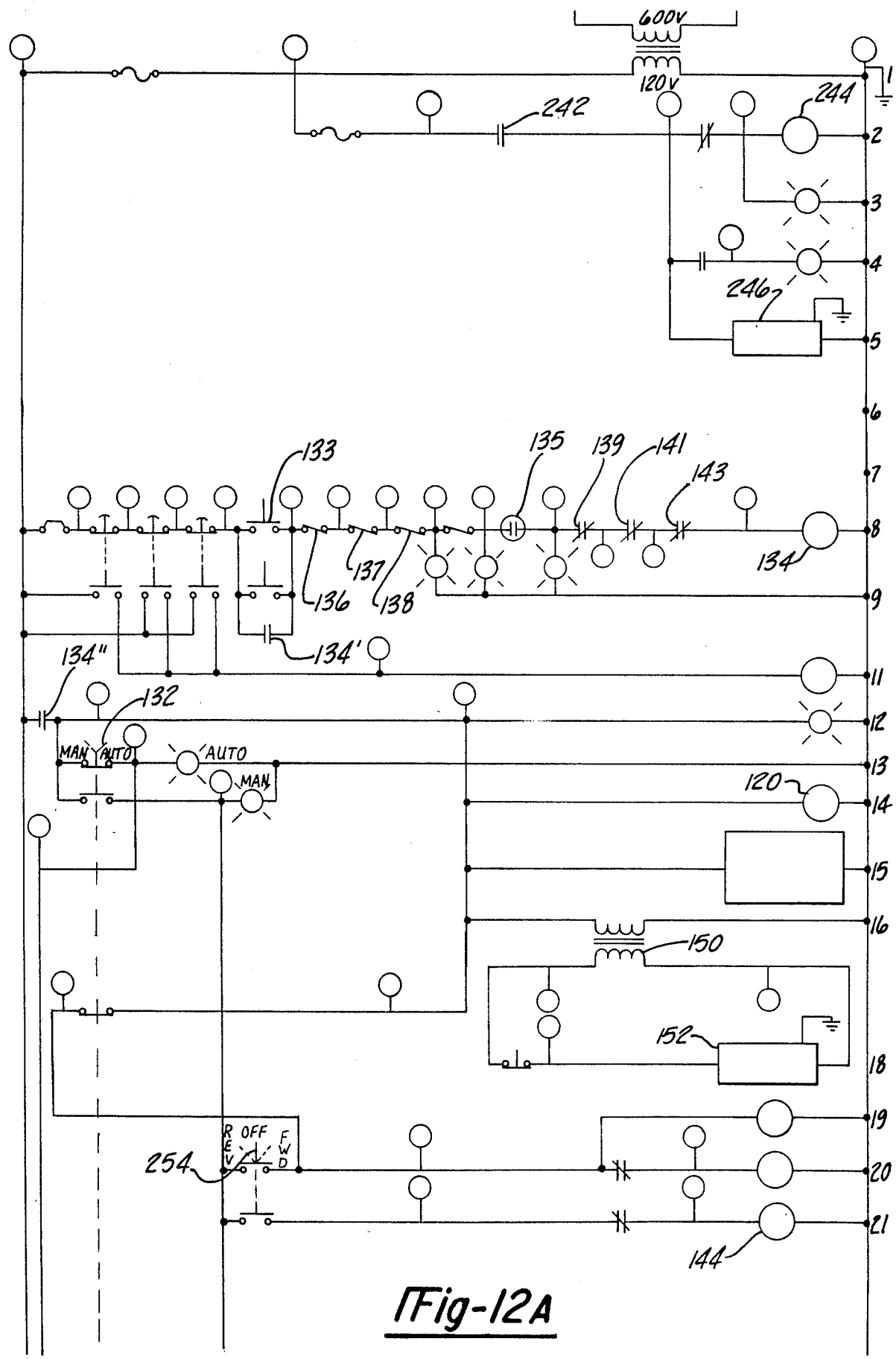
Figure 12C:
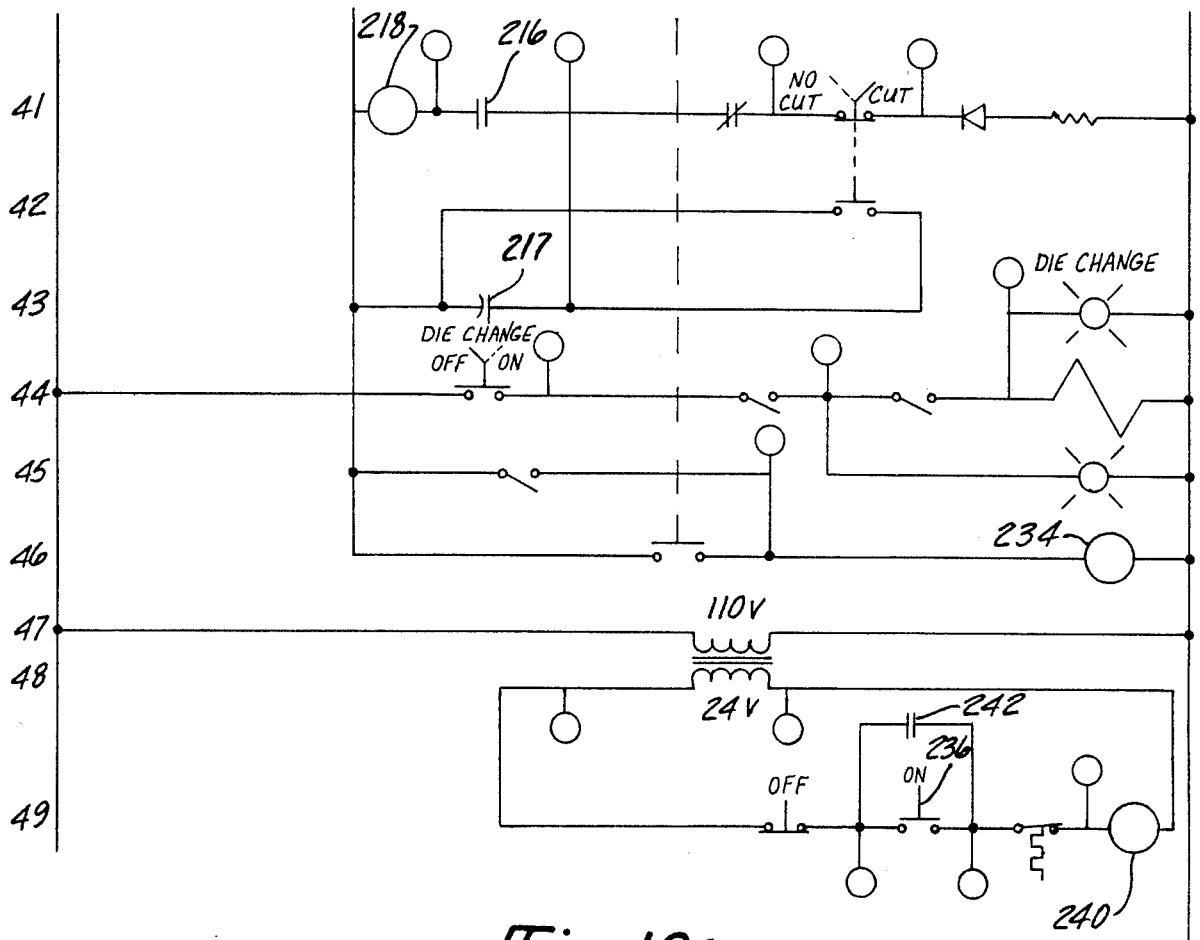

The electrical automatic cycle control system for operating the cut and seal process will now be described with reference to FIGS. 12A, 12B and 12C. Initially the manual/automatic selector switch 132 (FIG. 12A at line 13) is placed in its automatic mode by moving the switch 132 to its solid line automatic position. With reset switch button 133 in its manually depressed mode (FIG. 12A, line 8) control relay 134 seals itself in and its normally open contacts 134' (line 10) are closed energizing photoelectric switch 135 and limit switches 136, 137 and 138. Relay 134 also closes overload switch contacts 139 for the press hydraulic pump motor 120, the overload switch contacts 141 for runoff motor 103 and the overload switch contacts 143 for the motor 144 (line 21).

The control relay 134 normally open contacts 134" are also closed causing the hydraulic pump motor 120 to start. Further, the panel conveyor 42, press chain drive conveyors 108 and take-off conveyor belt 99 clutch/brake motor modules are energized together with an isolation transformer shown at 150 in FIG. 12A. The isolation transformer 150 (line 16) serves to protect an electronic counter generally indicated at 152 (line 18) of the circuit diagram. In the disclosed embodiment the counter 152 is a commercially available item or may be purchased from under the Durant name (Stock No. 55100-450). The operator presets the counter 152 for a certain number of pulse counts. This count corresponds to the predetermined number of encoder drive pulses required to count-out the counter preset number. During this counter time interval the panel 40 is advanced by the conveyor means a distance equal to its length "L". The face plate of the counter, shown at 154 in FIG. 11, has four counter read-out digit rolls 156, indicating the number of counter preset pulses, and a reset button 157.

A rolls/blocks selector switch, indicated at 158 in FIG. 12B—line 36, is shown in its solid line blocks mode. In its blocks or panels 40 mode counter electronic timer module 160 (line 38) is energized and runs. However, the counter 152 will not begin counting until photo-electric sensor or photocell means, to be described, senses lagging or trailing edge 162 of each advancing panel 40 to be cut and heat sealed by the press.

Figure 7:
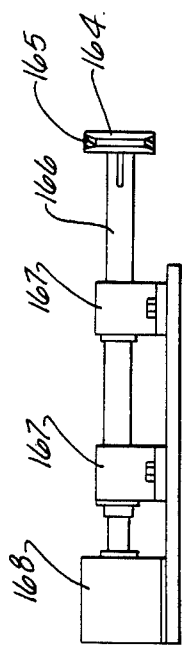
FIG. 7 is an enlarged detail view of the encoder assembly portion of the apparatus.
Figure 8:
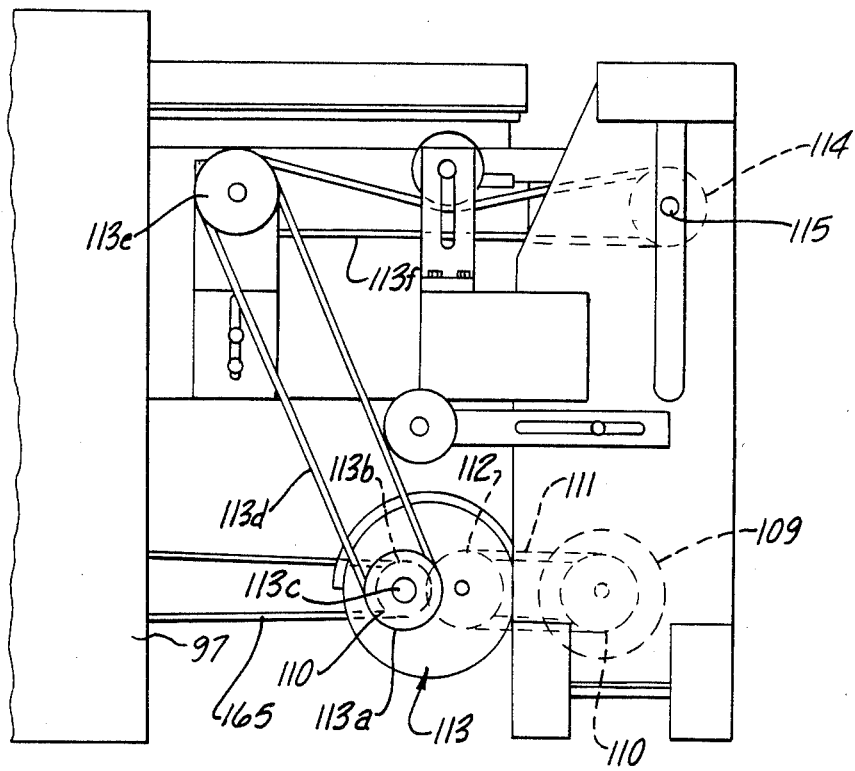
FIG. 8 is an enlarged fragmentary view taken in the direction of arrow 8 in FIG. 4 of the needle chain drive portion of the machine.

It will be noted in FIGS. 6, 7, and 8 that the gear reduction unit 113 has its second drive pulley 113b connected to a driven pulley 164 by drive belt 165. Thus, the driven pulley 164 is rotated at a speed directly proportional to the speed of the conveyor chains 108 advancing the web 27. The pulley 164 is mounted on one end of a transverse shaft 166 journally supported by mounts 167 to the press 94. An encoder assembly 168 is located on the other end of the shaft 166. The encoder assembly reads the shaft revolutions and transmits corresponding driving pulses to the counter 152.

As seen in FIGS. 4 and 8, a photo-electric or photocell sensor arrangement, generally indicated at 170, is adjustably mounted on the hinged plate 80 by a cantilever bracket support arm 172. A photocell light emitter or light source 174 is supported at the free end of arm 172 and positioned a predetermined distance above a curved shoe 173 which guides the web 27 between the shoe and hinged plate 84. A photocell detector 176 is positioned on the underside of the hinged plate 80. A light beam is projected from the source emitter 174 downwardly through an aperture in the shoe 173. The light penetrates the web 27 and an aligned aperture in the hinged plate (not shown) for reception by the photocell detector 176. The light source is transmitted as photoelectric impulses by wires to an on/off photoelectric cell output module shown at 180 (FIG. 12B, line 39). The emitter 174, detector 176 and output module 180 are commercially available items and may be purchased from Dolan-Jenner Industries Inc. under the stock Nos. 7401, 7070-6, and 7170-06, respectively.

The photo-electric sensor arrangement is designed for sensing the trailing edge 162 of each panel 40 having a uniform length "L" being advanced by the web 27. This is accomplished by the detector 176 sensing a predetermined light source intensity transmitted through the foam material of the web 27 which turns on the module 180. Thus, as seen in FIG. 4, upon the trailing edge 162 of panel 40' advancing downstream beyond the emitter's light beam the detector 176 receives a predetermined amount of the light beam through the transverse exposed web strip 27' between adjacent panels 40' and 40". This light is read by the detector 176 causing the module 180 to conduct and energize counter control relay 182 (line 39 in FIG. 12B) starting the counter's preset time count equal to the time interval for the panel trailing edge to be advanced the panel length "L". The output module 180 contacts are normally open with the web stopped and the panel 40' blocking the emitted light beam from reaching the detector 174.

A control relay 184 (line 37) is normally open so as to hold counter line contact 186 (FIG. 12C, line 55) closed and thus counter 152 at zero until the control relay 184 is energized. The control relay 184 contacts 188 (line 37) close energizing the electronic timer module 160 causing the counter to be energized and sealed-in. The counter 152 next reaches its preset condition wherein all the counter contacts change state. That is, counter normally closed contacts 190 (FIG. 7B—line 23) open wherein the web conveyor chains 108 stops. The electronic timer module 160 overrides the counter 152 in the event of a malfunction or if no panel 40 is located on the web 27 ready for advancement to the press. The counter timer module 160 is set to a predetermined time interval longer than the length of each panel 40.

With the counter 152 energized, contacts 190 are closed along with the limit switch contacts 192 and 194, cycle stop/start switch 196, limit switch contacts 198, 200, 202 and control relay 204 (line 26) normally closed contacts 206 a control relay 208 is energized and sealed-in. As a result the web 27 needle chain conveyor 46 drive is energized and the web 27 advances the panels 40 downstream from the sewing machine station 50. The web passes under the dancer roll 58 which travels up and down taking up any slack in the web 27. The run-out conveyor 99 and the needle chain conveyors 108 are started when limit switch contact 194 (FIG. 12B—line 23) is activated to its closed position. The dancer roll limit switches (not shown) are located on track member 63.

The needle chain conveyors 108 will advance the web until the counter 152 counts-out or until the dancer roller 58 trips an upper limit switch (not shown) on member 63 opening contact 194. If the limit switch contacts 194 open, the web needle chain conveyors 108 will stop until the dancer roll 58 again activates limit switch contacts 194 to the closed position. If the drive to the press needle chain conveyor 103 is turned off for any reason the multi-needle sewing machine apparatus will advance the web 27 and panels 40 through the sewing machine station 50 until the roll 58 activates its lower limit switch (not shown) on member 63 stopping the sewing operation.

The sewing machine station 50 and the cut and heat sealing die 90 are electrically interlocked in the automatic mode of the apparatus of FIG. 3. Press control relay 134 (line 8) contacts close in the sewing machine circuit and sewing machine control relay contacts close in the platen press circuit. It will be noted that when the cycle stop/start switch 196 is depressed the cycle is stopped and the count in retained. Also, when the switch 196 is pulled-out the cycle restarts and the count is resumed.

The counter 152 counts out the correct predetermined number of pulses preset for the length of the panel 40. Upon counting-out the counter's normally closed contacts 190 open deenergizing the control relay 208 (line 23) and the web advancing drive stops. It will be noted that the control relay 208 also operates the motor clutch/brake modules of the conveyors. Further, the counters normally open contacts 212 (line 25) and close energizing control relay 214. Control relay contacts 216 (FIG. 12C—line 41) close to charge/discharge capacitor 217 (line 43) providing voltage across control relay 218. With control relay contacts 216 closed control relay 204 receives a one-shot pulse as limit switch 222 (line 26) is closed, thus energizing the press hydraulic system valves (not shown).

It will be seen in FIG. 6 that upon energizing the clutch of the chain links drive motor 109, the drive belt 165 causes the driven pulley 164 to be rotated at a speed directly proportional to the speed of the sprockets 116 driving the web-advancing toothed chain links 108. Thus, the encoder 168 reads or counts the number of revolutions of the encoder shaft 166 during a predetermined given time interval required to advance the web 27 and a panel 40 a distance "L". The encoder transmits a corresponding number of driving pulses to the counter 152 after which the counter counts-out stopping the advancement of the web 27. By emperical time and distance tests, applicants' have determined that during this given time interval the encoder shaft 166 will be rotated a determined number of revolutions equivalent to the advancement of the web a distance "L".

An important feature of the invention concerns the use of photo-electric sensors to sense the trailing edge 162 of each panel 40. Upon the sensing of an advancing panel's trailing edge, the counter 152 is turned on and starts counting. After the counter counts-out a predetermined number of counts, governed by the number of diving pulses received from the encoder 168, the chain links 108 are stopped by the control circuit. As a result the movement of the web is temporarily stopped positioning the advancing panels' trailing edge 162 in exact alignment with the upstream edge of the cutting and sealing die 90. At this instant, the next following panel is positioned with its trailing edge 162 spaced a variable distance "X" upstream from the photo-source projector 174. In the present embodiment the variable distance "X" could be in the range of ½ in. to 6 inches depending upon the longitudinal spacing between the panels 40. It is a requirement that the variable distance "X" be at least a predetermined minimal distance sufficient to allow the leading edge of the next adjacent upstream panel to block the emitter light beam from the detector 176 turning the photo-sensor off a electronic change-of-state. The photo-sensor change-of-state resets the counter to zero time. This allows the counter to be restarted or triggered-on by virtue of the trailing edge 162 of the next upstream panel 40 advancing past the source projector 174 wherein its source of light penetrates the web foam material and is received by the detector 176.

Upon the counter 152 counting-out the given time interval the hydraulic motor valves are energized and the platen press 56 closes. Pressure switch 224 (FIG. 12B—line 30) closes at a set predetermined pressure. With the limit switch contact 202 closed control relay 226 (FIG. 12B—line 29) and electronic timer contacts 228 (line 34) are energized, i.e., when the press closes. The control relay 226 and timer contacts 228 are sealed in until its electronic timer 229 times-out. When the timing motor 228 times-out its contacts open and drops out the control relay 226 and the timer 229, thus opening the press by lowering the carriage assembly 86. This clears the apparatus for the next panel cutting and heat sealing operation if the apparatus, in all other respects, is ready.

In the cutting and heat sealing apparatus automatic non-cutting operation the platen press 94 may be operated in a rolls mode. The rolls mode is achieved upon a continuous roll of body cloth or vinyl material being fed from web 230 in FIG. 3 and advanced through the multi-needle sewing machine station 50. In the rolls mode the photocell sensor arrangement 170 is not required as the web driving conveyors continuously advance the web.

Another alternative non-cutting operating mode or function of the apparatus may be employed if only the panels 40 are to be produced. In this non-cutting mode, the counter 152 is operated for sensing panel length by means of the photo control arrangement described above. The conveyor drive means stops at every preset function but the press does not operate to cut and heat seal the panel 40. In this mode, each panel may be cut manually with a rotary knife, for example, on the roll-out conveyor 99.

A press daylight adjustment feature is provided which may be varied by adjusting a limit switch (not shown) of contact 202 up or down on carriage bar 231. The first cut and heat sealing operation starts at the bottom of the stroke. Succeeding cut and seal operations are determined by the position of limit switch contact 202. If after a run, the press remains in its on mode while not cycling, the press cutting platform will drop to its lowest level from its operating level. The above is achieved by setting control relay 232 (FIG.

12A—line 2) in the range of 30 to 60 seconds. Emergency stops PB 1, 2 and 3 cause the platform to drop at once. In the automatic cycle, upon the limit switch contact 192 and the cycle stop/start switch contact 196 being activated, a timer 234 will be energized (FIG. 12C—line 46). The press will drop to its lowest level after a preset time interval of 30 seconds. The above circuits are provided to position the panels 40 away from the heat of the cut and heat sealing die.

The heat circuit is fed through a 24 volt control-line (FIG. 12C—lines 47-49) and operates without the main control power turned on. The operator depresses push button 236 to energize control relay 240 (FIG. 12C—line 49) which seals in such that its normally open contacts 242 (FIG. 12A—line 2) close. This energizes heat contactor 244 which in turn energizes heat control 246 (FIG. 12A—line 5). If an over-temperature condition in the heat platen arises heat contactor relay 244 will turn off. The heating circuit may be manually restarted and may be turned off when required by depressing push button 248.

In the press only mode the PRESS ONLY/COMB selector switch 250 (line 22) is in the PRESS ONLY position such that the limit switches 192 and 194 are bypassed. This allows the press to run without operation of the sewing machine station 50. Thus a continuous roll of cover material may be directly fed into press station 56. With the FALES ONLY/COMP selector key type switch 252 on FALES it allows the sewing machine apparatus 50 to be run without the press.

In the manual mode, the MANUAL/AUTO selector switch 132 (line 13) is placed in its manual position and the apparatus operates as follows: With drive FWD/OFF/REV selector switch 254 in the direction required the operator depresses MANUAL push button 256, wherein the conveyor drive means advances the web but the counter 152 does not function. For the cutting and heat sealing operation CLOSE/OFF/DUMP selector switch 258 (line 31) is placed in its OFF position, with the press in a neutral position. With switch 258 in its closed position the platen press closes and with switch 258 in its dump position the platen press opens.

While only one embodiment of the inventive apparatus has been described, others are possible without department from the scope of the appended claims.

What is claimed is:

1. An apparatus for manufacturing a laminated fabric panel and riser insert for automobile seats comprising:

a web feeding section comprising a chain drag conveyor assembly operative for intermittently advancing a continuous web made of urethane sheet foam riser material in a downstream direction;

a plurality of rectangular-shaped cover panels of predetermined identical length and width supported on the upper surface of said web for travel therewith, said cover panels being longitudinally arranged with transverse exposed web spacing strip portions therebetween;

a sewing machine station comprising a plurality of sewing machines for stitching each cover panel to its underlying portion of said web;

a press station at a predetermined location downstream from said sewing machine station comprising first and second press members including power means connected to said press members for accommodating pressure engagement therebetween;

a cutting and heat-sealing die having upstream and downstream transverse edges said die carried by one of said press members, said die comprising a heated cutting rule adapted to engage each said cover panel and an associated underlying web portion stitched thereto at said predetermined location to effect cutting and heating sealing between perimeter portions of each cover panel and its associated underlying stitched web portion providing a cut and heat sealed border outlining a laminated seat insert, the improvement wherein;

said panels being manually positioned on said web with the transverse web spacing strips between adjacent panels defining unequal longitudinal distances characterized by each said spacing strip providing a predetermined minimal distance between adjacent panels;

control means comprising an electronic counter, photocell sensing means, and encoder means; said photocell sensing means positioned at a predetermined location upstream from said press station;

said photocell sensing means including a source projector emitting a light beam and a photocell detector with said projector and detector positioned in spaced relation on opposite sides of said web;

said chain drag conveyor assembly including electric motor means having an output shaft connected by a first drive belt to said chain drag conveyor assembly, said output shaft further connected by a second drive belt to an encoder shaft;

said encoder means operative for reading the revolutions of said encoder shaft and transmitting corresponding driving pulses to said electronic counter, whereby upon said counter counting-out after receiving a preset number of pulses causing said control circuit to successively position each advancing panel trailing edge in exact alignment with said die upstream edge;

said light beam of a predetermined intensity such that it is blocked from penetrating both a panel and its underlying web portion, said light beam intensity being such that it is transmitted through each said web spacing strip portion intermediate adjacent downstream and upstream panels for reception by said detector so as to turn said detector on as the trailing edge of each panel is advanced downstream past said light beam thereby activating said control means electronic counter;

upon the downstream panel trailing edge and said web being advanced past said light beam a distance equal to said panel length, said counter receiving a preset number of pulses from said encoder means wherein the movement of said web is temporarily stopped by said control means positioning the downstream panel at a rest interval with its trailing edge positioned in exact alignment with said die upstream edge;

wherein the next following upsteam panel is positioned with its trailing edge spaced a variable predetermined minimal distance upstream from said light beam such that, together with its underlying web portion, the next upstream panel blocks said light beam deactivating said photocell detector and resetting said counter to zero time;

said control means operative during said rest interval to cause said press members to close whereby the downstream cover panel and its underlying web portion are cut and heat-sealed forming a laminated insert upon pressure engagement of said press members; and wherein said control means operative to advance said web such that the laminated insert is transported therewith downstream from said press station for removal from said web resulting in the continuous production of laminated inserts.

2. The apparatus as set forth in claim 1, wherein said press station first member in the form of a vertically movable carriage assembly, an upwardly inclined hinged plate having an upstream end and a downstream end, said hinged plate upstream end pivotally supported on said apparatus about a transverse pivot axis intermediate said sewing machine station and said press station, said hinged plate having its downstream end supported on said carriage assembly for vertical travel therewith, said hinged plate operative for supporting said web on its upper surface as it is advanced downstream;

said photocell sensing means supported on said hinged plate for pivotal movement therewith, said light source projector supported on said hinge plate above said web and said detector supported on the underside of said hinged plate, and an aperture in said hinged plate through which said light beam is projected from said projector to said detector.

* * * * *